(12) United States Patent
Nicholson et al.

(10) Patent No.: US 9,314,049 B2
(45) Date of Patent: Apr. 19, 2016

(54) TUNNEL (75) Inventors: Keith Nicholson, Oakley (GB); Cedric Hanson, Nettleham (GB)

(73) Assignee: Linde Aktiengesellschaft, Munich (DE)

( * ) Notice: Subject to any disclaimer, the term of this patent is extended or adjusted under 35 U.S.C. 154(b) by 124 days.

(21) Appl. No.: 14/342,919

(22) PCT Filed: Sep. 7, 2012

(86) PCT No.: PCT/GB2012/000700
§ 371 (c)(1),
(2), (4) Date: Jun. 11, 2014

(87) PCT Pub. No.: WO2013/034874
PCT Pub. Date: Mar. 14, 2013

(65) Prior Publication Data
US 2015/0157050 A1    Jun. 11, 2015

(30) Foreign Application Priority Data
Sep. 8, 2011   (GB) .................................. 1115555.3

(51) Int. Cl.
| A22B 5/00 | (2006.01) |
| A23L 3/36 | (2006.01) |
| A22C 21/00 | (2006.01) |
| A23B 4/06 | (2006.01) |
| A23B 4/09 | (2006.01) |
| A23B 4/30 | (2006.01) |
| A23L 3/375 | (2006.01) |

(52) U.S. Cl.
CPC ............... *A23L 3/361* (2013.01); *A22B 5/0082* (2013.01); *A22C 21/0061* (2013.01); *A23B 4/064* (2013.01); *A23B 4/09* (2013.01); *A23B 4/30* (2013.01); *A23L 3/362* (2013.01); *A23L 3/375* (2013.01)

(58) Field of Classification Search
CPC ............... A22C 21/00; A22C 21/0053; A22C 21/0061; A22C 21/04
USPC .................................................. 452/177–184
See application file for complete search history.

(56) References Cited

U.S. PATENT DOCUMENTS

| 882,253 A | * | 3/1908 | Kunkel ................. | H02K 15/09 |
| | | | | 242/433.4 |
| 3,288,054 A | | 11/1966 | Weprin et al. | |

(Continued)

FOREIGN PATENT DOCUMENTS

| GB | 1 075 390 A | 7/1967 |
| JP | 2006262704 A | 10/2006 |

(Continued)

OTHER PUBLICATIONS

International Search Report for PCT/GB2012/000700, Date of Mailing: Feb. 8, 2013, Authorized Officer: Peter Boddaert, 9 pp.

*Primary Examiner* — Richard Price, Jr.
(74) *Attorney, Agent, or Firm* — Joshua L. Cohen (57) ABSTRACT

A tunnel for the in-line anti-bacterial treatment of plucked poultry carcasses (or other animal carcasses) with a liquid cryogen or a cold gas at a temperature of less than 0° C. has an entrance and an exit for the poultry carcasses. A continuous slot is formed in a roof of the tunnel and extends from the entrance to the exit. Poultry suspension shackles are able to pass through the slot. Thus, poultry carcasses are able to be conveyed through the tunnel. The slot follows a path which reverses direction at least once.

22 Claims, 4 Drawing Sheets

(56) References Cited

U.S. PATENT DOCUMENTS

| | | | | |
|---|---|---|---|---|
| 3,729,773 | A * | 5/1973 | Dillon | A22C 21/0061 426/524 |
| 3,744,088 | A * | 7/1973 | Snowden | A22C 21/04 452/77 |
| 3,769,807 | A | 11/1973 | Foster | |
| 4,199,958 | A | 4/1980 | Masuda et al. | |
| 4,674,152 | A * | 6/1987 | Auberti | A22B 5/08 452/73 |
| 5,232,394 | A * | 8/1993 | Covell, III | A22C 21/04 452/74 |
| 5,326,308 | A * | 7/1994 | Norrie | A22B 5/08 452/77 |
| 5,484,332 | A * | 1/1996 | Leech | A23B 4/26 452/173 |
| 5,577,392 | A | 11/1996 | Engler et al. | |
| 5,888,132 | A * | 3/1999 | Burnett | A22B 3/06 452/141 |
| 5,939,115 | A * | 8/1999 | Kounev | A22C 21/04 134/131 |
| 6,019,033 | A * | 2/2000 | Wilson | A23B 4/0053 126/20 |
| 6,733,379 | B2 * | 5/2004 | Tsang | A22C 17/08 452/173 |
| 7,189,157 | B2 * | 3/2007 | Wichelmann | A22C 21/04 452/77 |
| 7,207,879 | B2 * | 4/2007 | Kelly | A22C 21/04 452/77 |
| 7,244,172 | B2 * | 7/2007 | Horst | A22B 3/06 452/58 |
| 7,467,994 | B2 * | 12/2008 | Griffiths | A22B 5/0082 452/52 |
| 7,950,986 | B2 * | 5/2011 | Kelly | A22C 21/04 452/77 |
| 8,062,105 | B2 * | 11/2011 | Aandewiel | A22B 5/12 452/74 |
| 8,070,565 | B2 * | 12/2011 | Horst | A22C 21/0061 452/86 |
| 8,246,429 | B2 * | 8/2012 | Hilgren | A22C 21/0061 452/123 |
| 8,684,684 | B2 * | 4/2014 | Clements | F01D 5/143 415/193 |
| 2005/0153032 | A1 | 7/2005 | Hilgren et al. | |
| 2006/0204628 | A1 | 9/2006 | Jones et al. | |
| 2007/0026115 | A1 | 2/2007 | Van Den Nieuwelaar et al. | |
| 2007/0181010 | A1 | 8/2007 | Van Stuyvenberg | |
| 2010/0317272 | A1 | 12/2010 | Hazenbroek et al. | |

FOREIGN PATENT DOCUMENTS

| | | |
|---|---|---|
| NL | 9301244 A | 2/1995 |
| NL | 1013532 C2 | 5/2001 |
| WO | WO 98/14066 A1 | 4/1998 |
| WO | WO 99/35916 A2 | 7/1999 |

* cited by examiner

TUNNEL

This invention relates to a tunnel for the in line, anti-bacterial treatment of plucked poultry carcasses with a liquid cryogen and/or a cold gas.

When live poultry arrive at a processing plant, they are typically shackled at the ends of their legs and then conveyed in line through a sequence of stations at which they are stunned, humanely slaughtered, exsanguinated, scalded to soften the attachment of the feathers, plucked to remove the feathers, feet removed, decapitated, eviscerated, and washed. The resulting poultry carcasses are chilled.

Food-borne pathogens represent a significant and serious threat to human health. Numerous species of micro-organism reside naturally on many types of food. Some of these micro-organisms are capable of causing diseases in man upon ingestion. Sensible precautions, such as thorough cooling at an appropriate temperature, observation of correct storage protocols for raw and uncooked food, and adhering to proper hygiene standards when handling food, can all reduce but not eliminate incidence of such disease.

Among the disease-causing pathogens, *Campylobacter* is the most common bacterial cause of food poisoning. *Campylobacter* infection is extremely common in retail poultry. It is believed that transfer of *Campylobacter* bacteria to the skin occurs when the birds are slaughtered and eviscerated.

There is therefore a need for improved treatment of poultry carcasses. It has been reported that surface-borne micro-organisms can be destroyed by being subjected to a temperature below 0° C.

WO 2004/080189A discloses a method comprising of rapidly cooling meat by exposure to a rapid cooling temperature of no more than about minus 10° C. for sufficient time to provide a frozen crust on the meat and chilling the resultant crust-frozen meat by exposure of said crust-frozen meat to a chilling temperature greater than the cooling temperature but no more than about plus 10° C. to raise the temperature of the surface of the meat and to maintain said surface at a temperature no higher than the freezing temperature of the meat for at least sufficient time to injure lethally or kill bacteria, is used to reduce the viability of bacteria on meat. The method is stated to have particular application in the processing of poultry meat to kill bacteria.

It is recognised in WO 2004/080189A that the process described therein would preferably be mechanised for processing continuous lines of meat, e.g. poultry birds. It is stated that in preferred embodiments, the invention would be applied to an existing meat processing line and if means for rapidly cooling the meat were required, a rapid cooler would preferably be retrofitted to an existing chiller. Moreover, it is disclosed that in preferred embodiments the meat is rapidly chilled by mechanical refrigeration to produce crust frozen meat.

There remains however a need for practical equipment that is able to be incorporated into a poultry meat line without adversely affecting upstream or downstream processing of the poultry while enabling *Campylobacter* bacteria on the surface to be destroyed.

According to the present invention there is provided a tunnel for the in-line, anti-bacterial treatment of plucked poultry carcasses (or other animal carcasses) with a cryogenic liquid and/or a cold gas at a temperature below 0° C., the tunnel having an entrance and an exit for the carcasses and a continuous slot in the roof of the tunnel extending from the entrance to the exit, through which slot poultry (or other animal carcasses) suspension shackles are able to pass, wherein the slot follows a path which reverses direction at least once.

For a given residence time at a constant line speed, the configuration of the slot enables the length of the tunnel according to the invention to be less than it would have to be were the slot to follow a rectilinear path which does not reverse direction. Preferably, the said path reverses direction at least twice. Accordingly, the length of the tunnel is in the order of one third of what it would need to be were the path to extend simply in a straight line from entrance to exit. In consequence, there are likely to be less practical difficulties in accommodating the tunnel according to the invention in a commercial poultry processing line.

In order to supply the tunnel with cryogenic liquid and/or cold gas, the tunnel preferably has in it an array of nozzles for spraying a cryogenic liquid into the tunnel. The cryogenic liquid naturally vaporises so as to create a cold gas. A cryogenic liquid is one that boils at a temperature below minus 100° C. at a pressure of 1 bar. A typical cryogenic liquid for use in the tunnel according to the invention is liquid nitrogen or liquid air.

A tunnel according to the invention typically has in it a plurality of fans for moving cryogenic liquid mist and cold gas within the tunnel. There are various options for the fans. In one option, at least some of the fans direct gas laterally relative to the path taken by the poultry carcasses through the tunnel if desired, such fans may be impingement fans, that is fans which cause the cryogenic liquid mist and/or cold gas to impinge upon the carcasses. The nozzles may be arranged to direct droplets of cryogenic liquid at the poultry carcasses such that the cryogenic liquid droplets impinge upon the carcass. The nozzles may alternatively or additionally be arranged to introduce droplets of cryogenic liquid into the cold gas being directed at the poultry carcasses such that the cryogenic liquid has the opportunity to vaporise before it impinges the carcasses.

A tunnel according to the invention typically has baffles which are disposed so as, in use, to direct cold gas along the path followed by the poultry carcasses. The baffles typically each extend from floor to roof of the tunnel.

In one embodiment of a tunnel according to the invention each length of the path followed in use by the poultry carcasses has a row of spray nozzles associated with it. All the nozzles may point in the same direction.

A tunnel according to the invention typically has at least one outlet port for the extraction of gas from the tunnel. The said outlet port is typically operationally associated with an extraction fan, typically located in an extraction duct externally of the tunnel. The extraction fan or fans are typically operable to create a sub-atmospheric pressure in the tunnel so as to prevent or keep down loss of cold gas from the tunnel. In addition, a tunnel according to the invention typically has a door to permit access for the purposes of cleaning the tunnel.

In one preferred embodiment, the tunnel is arranged to provide a treatment and at least one of a pre-treatment and/or a post-treatment, wherein the tunnel is arranged to provide the treatment along a portion of the path along which the carcasses move in use, and wherein the tunnel is arranged to provide the pre and/or post treatment along another portion of the path along which the carcasses move in use. Preferably, the tunnel is arranged to provide a pre-treatment, a treatment and a post-treatment in sequence.

In another aspect, the invention provides an apparatus for handling carcasses of poultry (or other animals), the apparatus comprising: a tunnel according to the claims 1 to 14; a pre-treatment tunnel located upstream of the tunnel; and a post-treatment tunnel located downstream of the tunnel, wherein both the pre-treatment tunnel and the post-treatment tunnel comprise an entrance and an exit for the carcasses and a continuous slot in the roof of the tunnel extending from the entrance to the exit, through which slot poultry (or other animal) suspension shackles are able to pass. The pre and post treatment tunnels are preferably arranged to be supplied with developed gas and/or liquid cryogen from the tunnel.

By providing pre and/or post treatment stages in the tunnel itself, or by means of pre and/or post treatment tunnels, the overall chilling treatment of the carcasses can be managed and designed to provide a synergistic chilling process which makes the best use of the liquid cryogen/cold gas already being used in the treatment.

The invention also provides apparatus for handling poultry (or other animals) comprising a tunnel according to the invention and an overhead conveyor of poultry (or other animal) shackles, wherein the overhead conveyor follows a path corresponding to the said path followed by the slot.

The invention further provides a tunnel or apparatus as described above when located at least partially within the chiller of a poultry (or other animal) processing plant. Preferably, the said tunnel or apparatus is arranged to supply developed gas from the tunnel to the chiller, or to a heat exchanger located within the chiller. The developed gas may come from any one of the tunnel and/or the pre/post treatment tunnels if present.

BRIEF DESCRIPTION OF THE DRAWINGS

A tunnel and apparatus according to the invention will now be described by way of example with reference to the accompanying drawings, in which.

DETAILED DESCRIPTION OF THE INVENTION

The drawings are schematic and have been simplified to aid understanding of the invention. For example, an overhead conveyor and shackles are illustrated only in FIG. 2; the fan blades are not shown in any of FIGS. 1 to 4; the fans and spray bars are omitted from FIG. 3; and means for supplying the cryogenic liquid to the spray bars are omitted from all the drawings.

Referring to the drawings, a tunnel 2 stands on legs 4, which may be provided with adjustable feet (not shown) so as to assist in installing the tunnel 2 such that its floor is truly horizontal. The tunnel 2 has a floor 6 and a roof 8; a pair of end walls 10 and 12; and a pair of side walls 14 and 16. An entrance 18 for poultry carcasses is formed in the end wall 10 and a complementary exit 20 for poultry carcasses from the tunnel 2 is formed in the end wall 12. Although not shown in the drawings, the floor 6, roof 8, end walls 10 and 12 and side walls 14 and 16 are all thermally insulated. In a typical embodiment, each of the aforementioned walls, floor and roof is formed of a double-walled structure, thermal insulation being located between the double walls.

Figure 1:
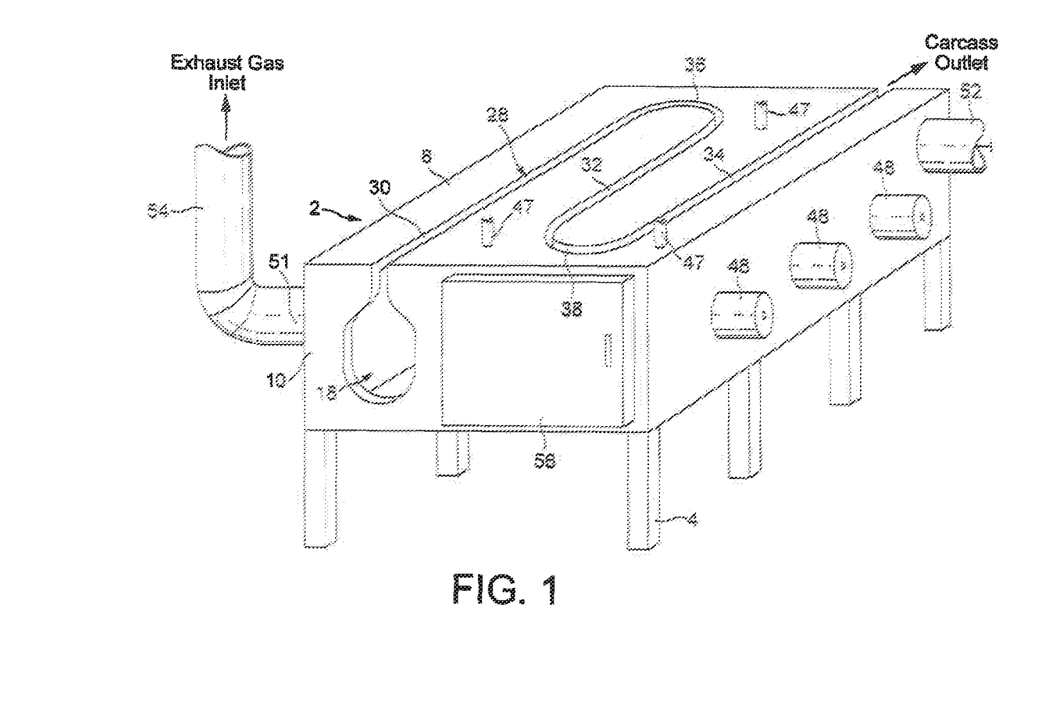
FIG. 1 is a schematic perspective view of a cooling tunnel for the treatment of poultry carcasses.
Figure 2:
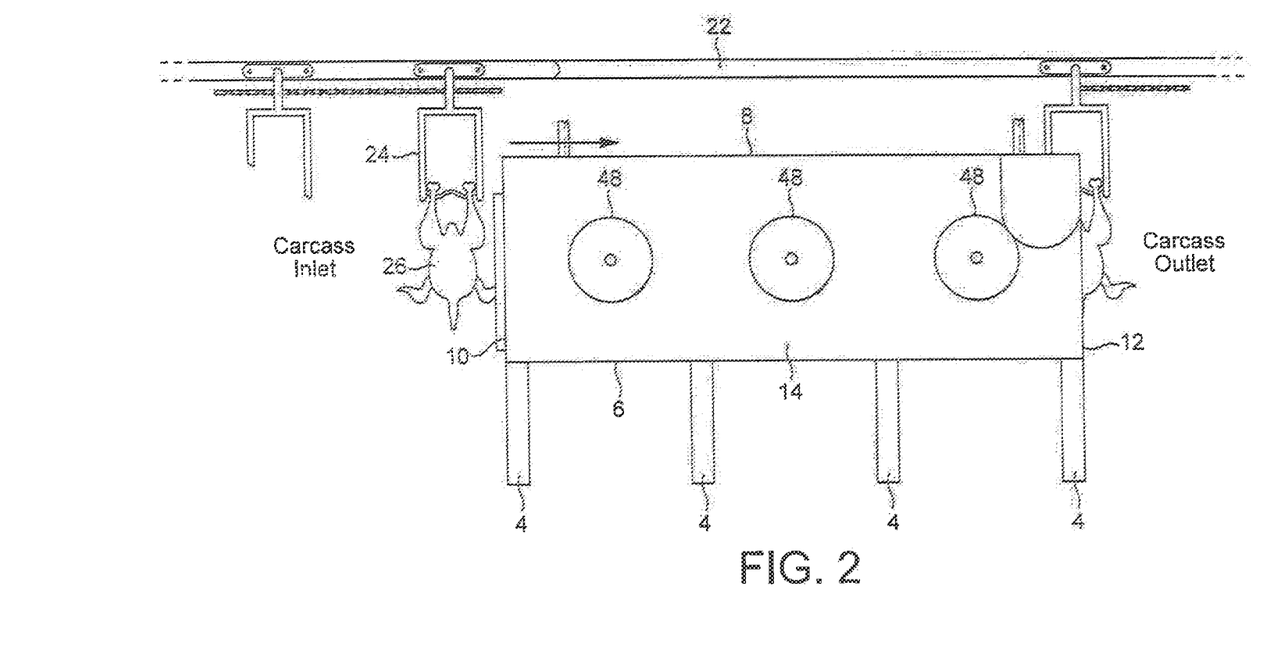
FIG. 2 is a side view of the tunnel shown in FIG. 1.

As shown in FIG. 2, the tunnel 2 is associated with an overhead conveyor 22 of a conventional kind in poultry carcass handling installations. The conveyor 22 is able to advance shackles 24 from which the poultry carcasses are suspended by their legs along a chosen path. The roof 8 of the tunnel 2 is provided with a continuous slot 28 there through, the slot 28 extending from the entrance 18 to the exit 20. The slot 28 has straight runs 30, 32 and 34 extending parallel to the side walls 14 and 16. The runs 30 and 32 are connected by a U-bend 36 and the runs 32 and 34 are connected by a U-bend 38. The slot 28 thus defines a path which reverses direction the first time at the U-bend 36 and a second time at the U-bend 38. Although not shown in the drawings, the conveyor 22 follows a path that corresponds to that of the slot 28 so as to enable the poultry carcasses to be passed through the tunnel from the entrance 18 to the exit 20 along a generally S-shaped path determined by the configuration of the slot 28. Any suitable path shape and/or run trajectory may be used.

The tunnel 2 is provided with means for subjecting the poultry carcasses to temperatures below 0° C. Such treatment has previously been reported (for example in WO2004/080189 A1) to have an anti-bacterial effect, particularly in respect of *Campylobacter* bacteria. Accordingly, poultry carcasses 26 are contacted with cryogenic liquid mist (comprising cryogenic liquid droplets) and/or cold gas as they pass from the entrance 18 of the tunnel 2 to the exit 20. The cryogenic liquid mist and/or cold gas is created by spraying a liquid cryogen, typically liquid nitrogen or liquid air, for example, into the tunnel 2. For the sake of simplicity, for the remainder of this description liquid nitrogen will be used as an illustrative example of a liquid cryogen. However, it is to be understood that any suitable liquid cryogen may be used in place of liquid nitrogen.

Liquid nitrogen is introduced into the tunnel 2 as a fine mist via a plurality of spray nozzles 46. Depending on the treatment method being used, the nozzles 46 may either be arranged to direct the liquid nitrogen directly at the carcasses so that the droplets of liquid nitrogen impinge on the carcasses, or they may be arranged so that the liquid nitrogen has the opportunity to vaporise to form a cold gas before impinging on the carcasses. In the case where the nozzles 46 are arranged to direct the liquid nitrogen to impinge directly on the carcasses, there will be some vaporisation of the liquid nitrogen before it so impinges. Liquid nitrogen which has impinged on the carcasses will also vaporise. The nitrogen vapour, whether formed by direct impingement on the carcasses or not, spreads and/or circulates within the tunnel 2 to form a cold gas atmosphere (typically −196° to −170° C. representative). If desired, some of the nozzles 46 may be arranged to direct the liquid nitrogen at the carcasses for direct impingement, while others may be arranged so that the liquid nitrogen has the opportunity to vaporise before impingement with the carcasses. If desired, the nozzles 46 in the upstream portion of the tunnel 2 may be arranged to direct the liquid nitrogen at the carcasses for direct impingement, and nozzles 46 in the downstream portion of the tunnel 2 may be arranged to allow the liquid nitrogen to vaporise before impingement with the carcasses. This arrangement may be reversed if desired. Alternatively, the operation and direction of the nozzles 46 may vary along the length of the runs 30, 32, 34 within the tunnel 2 as desired.

Figure 4:
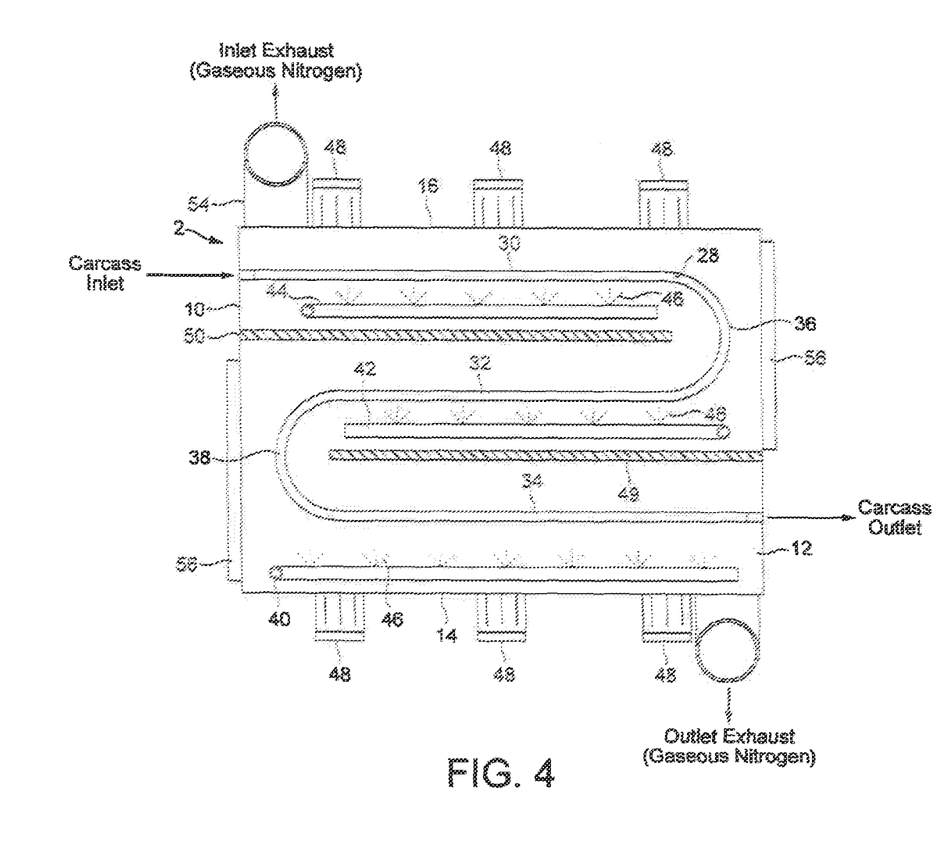
FIG. 4 is a plan view of the tunnel shown in FIG. 1, but with the roof removed.

In the example shown in FIG. 4, the tunnel 2 is provided with spray bars 40, 42 and 44 depending from the roof 8. Each of the spray bars 40, 42 and 44 is provided with a row of spray nozzles 46. As shown in FIG. 4, all the spray nozzles 46 point in the same direction. In use, nozzles 46 in the spray bar 40 face poultry carcasses for the time being under the run 34 of the slot 28, the spray nozzles 46 in the spray bar 42 face the poultry carcasses for the time being under the run 32 of the slot 28, and the nozzles 46 in the spray bar 44 face poultry carcasses for the time being the run 30 of the slot 28. In operation, droplets of liquid nitrogen are ejected from the nozzles 46 in the form of a spray or fine mist. Fans 48 are provided through the side walls 14 and 16 of the tunnel 2 in order to circulate the liquid nitrogen mist and cold nitrogen gas and to direct it towards the carcasses being conveyed through the tunnel 2. Typically, the fans are of the type that cause turbulence, and may also create so large a velocity as to cause energetic impingement of the liquid nitrogen mist and cold nitrogen gas on the poultry carcasses. In operation, a static boundary layer of cold gas tends to form around the carcasses in the tunnel 2. For impingement to occur, the flow of cold gas or mist needs to have sufficient velocity to penetrate the static boundary layer. If desired, additional or alternative fans (not shown) may be employed to create relatively high velocity jets of nitrogen mist/gas which retain their velocity as they impinge against the poultry carcasses. The liquid nitrogen is supplied to the spray bars 40, 42 and 44 from a thermally-insulated storage vessel (not shown) conveniently located near to the tunnel 2 via appropriately thermally-insulated piping (not shown) which has terminations in inlets 47 to the spray bars 40, 42 and 44. The operating pressure of the storage vessel is typically about 3 bar gauge for liquid nitrogen.

In one arrangement of fans (not shown) a "false" wall is provided at both side walls 14 and 16 of the tunnel. Both false walls are provided with a plurality of ports, each port being associated with an impingement fan. The impingement fans are positioned between the negative false walls and side walls 14, 16 and are arranged so as to direct flows of gas through the ports at the carcasses. The spaces between a false wall and the negative side wall can serve as a passage for gas to the fans, and a suitable gap may be left between the floor of the tunnel and the bottom of each false wall.

It will be appreciated from FIG. 4 that in any position in the tunnel 2 a poultry carcass has liquid nitrogen mist and/or cold nitrogen gas directed at it from one side only. It is, however, within the scope of the invention to employ additional spray bars so that, in operation, in any particular position within the tunnel 2, a poultry carcass has liquid nitrogen/nitrogen gas directed at it from both sides. Because the slot 28 is generally S-shaped, the entire external surface of each poultry carcass is contacted with cold nitrogen vapour. It is beneficial to direct the liquid nitrogen/nitrogen gas at both sides of the carcass as this helps to ensure that any hidden areas of the carcass, such as neck flaps, are exposed to the liquid nitrogen/nitrogen gas.

Figure 3:
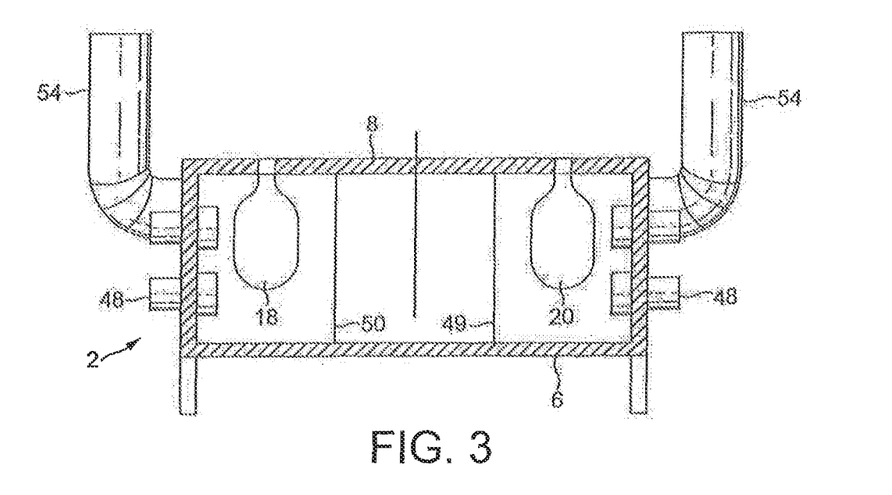
FIG. 3 is an end view of the tunnel shown in FIG. 1.

Contact between the liquid nitrogen mist and or cold nitrogen gas may be facilitated by the provision in the tunnel 2 of baffles 49 and 50. As shown in FIG. 3, baffles 49 and 50 both extend from the floor 6 to the roof 8 of the tunnel 2. The baffles 49 and 50 direct the liquid nitrogen mist/nitrogen gas along the path corresponding to that followed by the poultry carcasses but in the reverse direction. Tunnel 2 is typically provided with a first outlet port 51 near the entrance 18 for spent nitrogen mist/gas and a second outlet port 52 near the exit 20 for such mist/gas. The ports 51 and 52 are typically formed near the top of the side walls 14 and 16 respectively. The ports 51 and 52 communicate with an exhaust duct 54 (see FIG. 1) which is able to lead the nitrogen to a location where it can be safely discharged to the atmosphere without causing any hazard to human life or re-used in another process. If desired, the exhaust duct may have a fan (not shown) located in it so as to assist in the withdrawal of nitrogen gas from the tunnel 2. This exhaust fan is typically set to operate at a speed so as to maintain a (small) subatmospheric pressure in the tunnel to avoid any nitrogen spilling out of the tunnel through the entrance 18, the exit 20 or the slot 28. The operation of such exhaust fans is well known in the art of cryogenic freezing tunnels.

The tunnel 2 is typically provided with a door 56 in its end wall 10, and a similar door 56 in its end wall 12, so as to permit ready access to the interior to the tunnel 2 for the purposes of routine and regular cleaning of it.

The tunnel 2 shown in the drawings may have dimensions selected for the treatment of the carcasses of a particular species or genus of poultry, for example, the carcasses of chickens or turkeys.

The rate at which the carcasses are conveyed through the tunnel 2 is determined by the operation of the poultry line. As is well known in the art, such a poultry line is required to transport poultry, at first live, to stations at which the birds are, in sequence, stunned, humanely slaughtered, exsanguinated, scalded to soften the attachment of the feathers, plucked to remove the feathers, decapitated, eviscerated, and washed. After washing, the birds are conveyed to a chiller such as a blast chiller or refrigerator in which they are held in chilled state. The tunnel 2 according to the invention may be located either downstream of the chiller or, more preferably, within the chiller itself.

It is believed that the step of evisceration can cause the spread of harmful bacteria such as *Campylobacter* to the external surfaces of the plucked birds. Washing is found not to be fully effective in removing the bacteria. As previously mentioned, subjection of the carcasses to temperatures below 0° C. has an anti-bacterial effect. The tunnel 2 therefore has to be operated so as to give the carcasses an adequate exposure to the liquid nitrogen mist/cold nitrogen gas. A minimum exposure time is typically in the order of five to sixty seconds depending on the size of the carcass. Typically, the birds are conveyed at a line speed in the order of 20 to 50 meters per minute or more in some cases. The desired residence time of the birds in the gas dictates the path length followed by the carcasses. For example, if the residence time in the tunnel 2 is one minute and the line speed is 50 meters per minute, a path length of 50 meters is required. By providing the slot 28 with 3 runs 30, 32 and 34, the overall length of the tunnel 2 can generally be kept below about 20 meters. For a residence time of 20 seconds, for a line speed of 50 meters per minute, a path length of 16.67 meters is required. By providing the slot 28 with 3 runs 30, 32 and 34, the overall length of the tunnel 2 can generally be kept below about 6.5 meters. In a further example, for a residence time of 20 seconds at a line speed of 27 meters per minute, a path length of 9 meters is required. By providing the slot 28 with 2 runs, the overall length of the tunnel 2 can generally be kept below about 5 meters. If the tunnel 2 were provided with additional runs, it could be made even shorter. In general, in view of limitations in available factory space, the shorter the tunnel, the fewer problems are created when it comes to its installation in a typical poultry line.

The rate of introduction of the cryogenic liquid into the tunnel may be adjusted to give the desired tunnel operating temperature. A typical tunnel operating temperature might be below minus 80° C. Preferably, the tunnel operating temperature will be in the range minus 170° C. to minus 196° C. The tunnel operating temperature will typically be measured by a temperature probe located somewhere within the tunnel 2. It will be understood by those skilled in the art that the temperature measured my the temperature probe will be representative only of the overall operating temperature within the tunnel and that the temperature distribution within the tunnel will vary depending on proximity to the nozzles 46, proximity to the carcasses and position along the length of the runs 30, 32, 34. The operating parameters of the tunnel are preferably set by means of a desired tunnel operating temperature and the temperature of the incoming liquid cryogen. A typical driving pressure for the liquid cryogen will be in the region of about 1 to 3.5 bar gauge. As mentioned above, for liquid nitrogen, the liquid will be supplied to the nozzles 46 at about 3 bar gauge.

It will be appreciated from the drawings that the width of the tunnel is appreciably less than its length. One criterion affecting the width of the tunnel 2 is the desirability of maintaining a suitable separation distance between the nozzles 46 and the poultry carcasses in operation of the tunnel 2. This is so as to avoid unnecessary freezing of the carcass meat itself. It is preferred to create a sub-zero temperature at the external surfaces of the carcasses, so as to damage fatally *Campylobacter* bacteria thereupon, without freezing the poultry meat beneath the surface. The reason for this preference is twofold. First, the freezing of the muscle meat is unnecessary so far as the anti-bacterial treatment of the poultry is concerned and therefore represents a wastage of the refrigeration contained in the cryogenic liquid that is sprayed into the tunnel 2. Secondly, freezing the meat reduces the value of the carcasses, at least in the EU, where, once frozen, poultry meat if subsequently thawed, is not permitted to be sold as fresh. The rate at which liquid nitrogen or other cryogenic liquid is introduced into the tunnel and the speed at which the fans are operated can be determined by simple experiment so as to create the desired external surface temperature on each carcass at its exit from the tunnel 2 while keeping down the consumption of liquid nitrogen or other cryogenic liquid.

The apparatus according to the invention may be adapted to that anti-bacterially the carcasses of animals other than poultry, for example, the carcasses of pigs.

In another embodiment of the invention, the treatment equipment may include zonal treatment areas. In one example, the tunnel 2 may be located between an upstream pre-treatment tunnel (not shown) and a downstream post-treatment tunnel (not shown). The pre and post treatment tunnels will each have an entrance, an exit and a slot in the roof for allowing the passage of shackles carrying poultry (or other animal) carcasses generally as described above for tunnel 2. The slot, and associated shackles passing there through in use, may follow a linear path or a path which includes U-bends such as U-bends 36, 38 shown in FIG. 4. The path may alternatively be any other suitable shape such as arcuate. The pre and post treatment tunnels may be provided with any suitable equipment for treating the carcasses as they pass through the tunnels. In particular the pre and post treatment tunnels may be equipped with nozzles for spraying a cryogenic liquid into the tunnels. In a preferred embodiment, developed gas from the main treatment tunnel 2 will be fed into the pre and/or post treatment tunnels to control the atmosphere and temperature therein. In one example the pre-treatment tunnel may be used to pre-chill the carcasses before they enter the main treatment tunnel 2, and the post treatment tunnel may be used to raise the temperature of the carcasses exiting the main treatment tunnel 2. A heater may be provided in either of the pre or post treatment tunnels to control the temperature within the tunnels. Alternatively or additionally, the atmosphere/temperature may be controlled in the tunnels by the introduction of the same/another gas (in liquid or gaseous form).

In a further alternative embodiment of the invention, the tunnel 2 as shown in FIG. 4 may be adapted to include pre and post treatment zones. For example the first run 30 may be a pre-treatment zone, the run 32 the main treatment zone and run 34 the post treatment zone. The introduction of the liquid cryogen via nozzles 46 may be adapted as necessary depending on desired flow rates, temperatures etc. Additional treatment equipment such as gas injection nozzles, fans, heaters etc. may be included in the pre and post treatment zones as desired.

In order to capitalise on the cooling potential of the liquid cryogen used in the pre, post or main treatment tunnel(s), it is envisaged that developed gas (developed from the evaporating liquid cryogen) may be used in an upstream or downstream process as appropriate. One such use is to feed the developed cold gas to the chiller in which, or after which, the tunnel(s) reside. In the case of liquid air, the developed gas may be fed directly into the chiller as a breathable atmosphere will be maintained in the chiller. For other gases, such as nitrogen for example, it may not be possible to feed the developed gas directly back to the chiller as this may be detrimental to the breathability of the atmosphere in the chiller. In this case, the developed gas may be fed through a heat exchanger which resides within the chiller. If necessary, the developed gas may be treated or scrubbed before it is used in any other upstream or downstream processes.

It is also considered to be within the scope of the invention to use the treatment tunnel(s) for any other type of carcass treatment which is suitable for use in a continuous in-line process. Such treatments may include, for example, lactic acid treatment, steam wash, water spray, ultra violet, infra red, ozone or any combination thereof.

What is claimed is:

1. A tunnel for in-line anti-bacterial treatment of plucked animal carcasses with a fluid selected from at least one of a cryogenic liquid and a cold gas at a temperature below 0° C., comprising:
    an entrance and an exit for the carcasses, and
    a continuous slot in a roof of the tunnel extending from the entrance to the exit, the continuous slot sized and shaped to receive carcass suspension shackles to pass therethrough and be arranged in a path which reverses direction at least once,
    wherein said tunnel is disposed at least partially within a chiller of an animal processing plant.

2. The tunnel according to claim 1, wherein the slot is arranged in the path which reverses direction at least twice.

3. The tunnel according to claim 1, wherein the tunnel further comprises an array of nozzles for spraying the fluid into the tunnel.

4. The tunnel according to claim 3, wherein the array of nozzles are arranged to introduce droplets of the cryogenic liquid into the cold gas directed by fans at the animal carcasses.

5. The tunnel according to claim 3, wherein the array of nozzles are arranged to direct droplets of the cryogenic liquid to impinge on the animal carcasses.

6. The tunnel according to claim 1, further comprising a plurality of fans for moving the fluid within the tunnel.

7. The tunnel according to claim 6, wherein at least one of the plurality of fans is positioned to direct the fluid laterally relative to the path for the animal carcasses through the tunnel.

8. The tunnel according to claim 6, wherein at least one of the plurality of fans is an impingement fan.

9. The tunnel according to claim 1, further comprising a plurality of baffles disposed to direct the cold gas along the path.

10. The tunnel according to claim 1, further comprising a row of spray nozzles operatively associated with a length of the path in each direction, said spray nozzles adapted to direct the cryogenic liquid at the animal carcasses.

11. The tunnel according to claim 10, wherein the spray nozzles are arranged to direct the cryogenic liquid in a similar direction.

12. The tunnel according to claim 1, further comprising at least one outlet port in communication with the tunnel for extracting gas from the tunnel.

13. The tunnel according to claim 1, wherein the tunnel further comprises a treatment portion and at least one of a pre-treatment portion and a post-treatment portion, wherein the treatment portion is arranged along one direction of the path, and the at least one of the pre-treatment portion and the post-treatment portion is arranged along another direction of the path.

14. The tunnel according to claim 13, wherein the pre-treatment portion, the treatment portion and the post-treatment portion are arranged in sequence.

15. The tunnel according to claim 14, wherein at least one of the pre-treatment tunnel portion and the post-treatment tunnel portion are arranged to be supplied with the fluid.

16. An apparatus for handling animal carcasses, comprising a tunnel according to claim 1, and further comprising an overhead conveyor connected to said carcass suspension shackles, wherein the overhead conveyor follows another path corresponding to the said path of the slot in the roof of the tunnel.

17. The apparatus according to claim 16, wherein said apparatus is disposed at least partially within a chiller of an animal processing plant.

18. The apparatus according to claim 17, wherein the apparatus is constructed and arranged to supply developed gas from the tunnel to the chiller or to a heat exchanger located within the chiller.

19. An apparatus for handling animal carcasses comprising:
   a tunnel according to claim 1;
   a pre-treatment tunnel located upstream of and in communication with the tunnel; and
   a post-treatment tunnel located down stream of and in communication with the tunnel, wherein the pre-treatment tunnel comprises the entrance and the post-treatment tunnel comprises the exit for the animal carcasses.

20. The tunnel according to claim 1, wherein the tunnel is constructed and arranged to supply developed gas from the tunnel to the chiller or to a heat exchanger located within the chiller.

21. An apparatus for handling animal carcasses, comprising:
   a tunnel for in-line anti-bacterial treatment of plucked animal carcasses with a fluid selected from at least one of a cryogenic liquid and a cold gas at a temperature below 0° C., the tunnel comprising:
   an entrance and an exit for the carcasses,
   a continuous slot in a roof of the tunnel extending from the entrance to the exit, the continuous slot sized and shaped to receive carcass suspension shackles to pass therethrough and be arranged in a path which reverses direction at least once, and
   an overhead conveyor connected to said carcass suspension shackles, the overhead conveyor arranged to follow another path corresponding to the path of the slot in the roof of the tunnel,
   wherein said tunnel is disposed at least partially within a chiller of an animal processing plant.

22. The apparatus according to claim 21, wherein said apparatus is constructed and arranged to supply developed gas from the tunnel to the chiller or to a heat exchanger located within the chiller.

* * * * *